United States Patent
Ghannam et al.

(10) Patent No.: US 9,174,595 B2
(45) Date of Patent: Nov. 3, 2015

(54) COLLISION SENSING AND ENERGY ABSORBING APPARATUS

(71) Applicant: Ford Global Technologies, LLC, Dearborn, MI (US)

(72) Inventors: Mahmoud Yousef Ghannam, Canton, MI (US); Steven Yellin Schondorf, Dearborn, MI (US); Abraham G. Philip, Rochester Hills, MI (US); David James Tippy, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 9 days.

(21) Appl. No.: 14/223,984

(22) Filed: Mar. 24, 2014

(65) Prior Publication Data

US 2015/0266438 A1    Sep. 24, 2015

(51) Int. Cl.
*B60R 19/48* (2006.01)
*B60R 19/20* (2006.01)
*B60R 21/0136* (2006.01)
*B60R 19/18* (2006.01)

(52) U.S. Cl.
CPC ............... *B60R 19/483* (2013.01); *B60R 19/20* (2013.01); *B60R 21/0136* (2013.01); *B60R 2019/186* (2013.01)

(58) Field of Classification Search
CPC ............... B60R 19/20; B60R 21/0136; B60R 2019/186; B60R 19/483
See application file for complete search history.

(56) References Cited

U.S. PATENT DOCUMENTS

| | | | |
|---|---|---|---|
| 7,331,415 B2 | 2/2008 | Hawes et al. | |
| 7,631,565 B2 * | 12/2009 | Tanabe | 73/862.474 |
| 7,637,545 B2 * | 12/2009 | Takahashi et al. | 293/132 |
| 7,768,381 B2 * | 8/2010 | Takafuji et al. | 340/436 |
| 7,823,683 B2 * | 11/2010 | Kiribayashi | 180/274 |
| 2007/0114771 A1 * | 5/2007 | Wanami et al. | 280/735 |

FOREIGN PATENT DOCUMENTS

| | | |
|---|---|---|
| DE | 102007041786 | 4/2008 |
| DE | 102009034261 | 2/2010 |
| DE | 102010000224 | 8/2010 |
| DE | 102010037023 | 4/2011 |
| DE | 102012105663 | 1/2013 |

OTHER PUBLICATIONS

Takahashi, et al., "Development of Pop-Up Hood System for Pedestrian Protection", 6 pages.
"MEMS Pressure Sensor Solutions for Automotive Applications", www.si-micro.com, 8 pages.

* cited by examiner

*Primary Examiner* — Lori L Lyjak
(74) *Attorney, Agent, or Firm* — Frank A. MacKenzie; Bejin Bieneman PLC

(57) ABSTRACT

An apparatus includes an enclosed body defining a chamber therein. The body includes a rearward portion, a forward portion opposite the rearward portion and a first portion extending between the rearward and forward portions. The first portion has a stiffness less than at least one remaining portion of the body. The apparatus further includes at least one pressure sensor coupled to the body and the chamber to detect deformation of the first portion of the body.

18 Claims, 7 Drawing Sheets

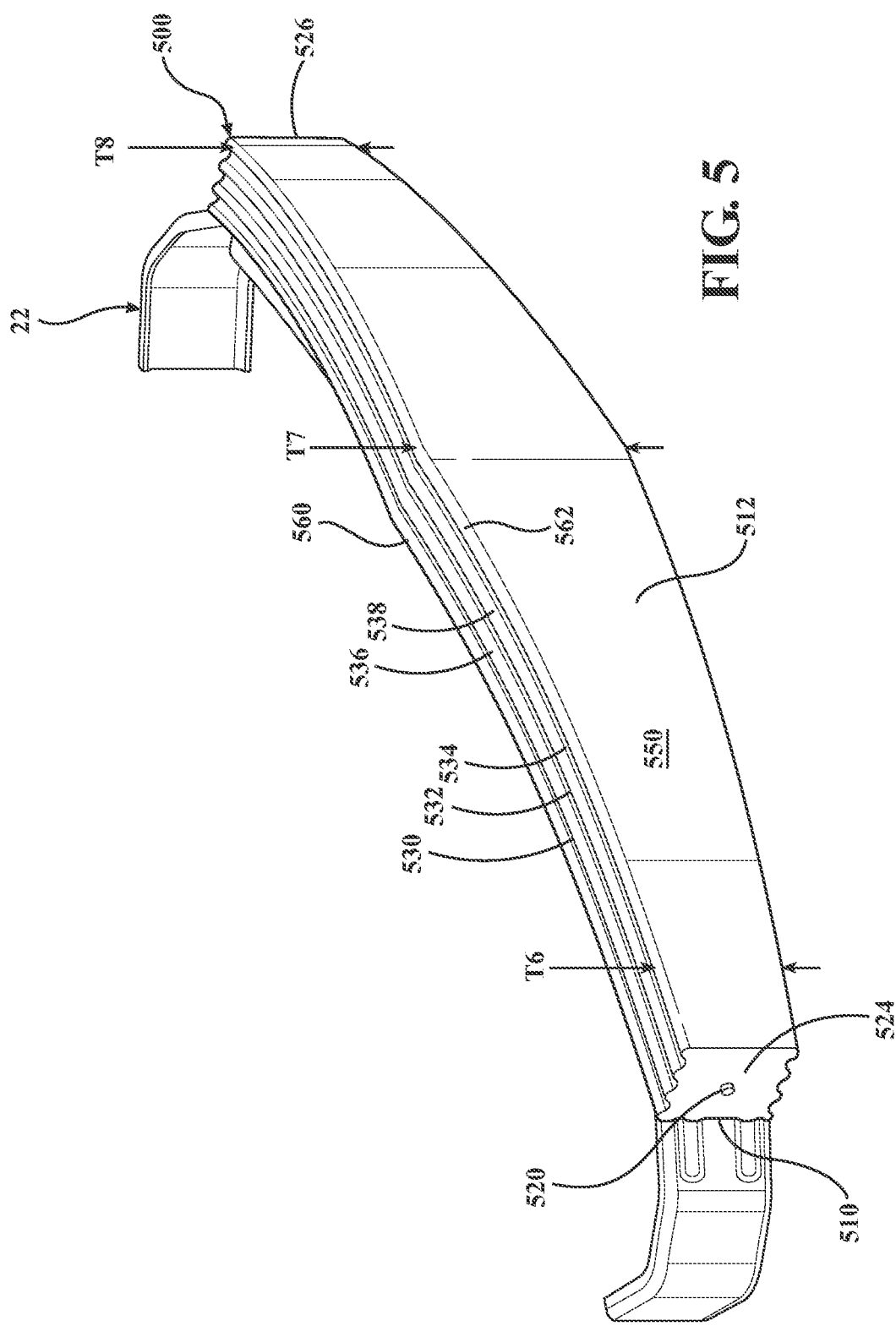

COLLISION SENSING AND ENERGY ABSORBING APPARATUS

BACKGROUND

Vehicles, such as automobiles, may include equipment for mitigating the impact of a range of collisions. For example, for relatively large magnitude collisions (e.g. with another vehicle at a high speed), vehicles may further include systems and components for managing the collision energy, such as certain components that deform and/or detach towards reducing collision impact on the passenger areas. In another example, for collisions with pedestrians, vehicles may include equipment such as bumper- or hood-mounted airbags and hood-lifting systems. To control and employ such equipment, the vehicle is required to detect a corresponding collision. Current mechanisms for detecting such collisions suffer from drawbacks including, for example, their complexity and cost.

DRAWINGS

FIG. 5 is a perspective view of the exemplary bumper beam of FIG. 1 and another exemplary pressurized energy absorber.

DETAILED DESCRIPTION

Figure 1:
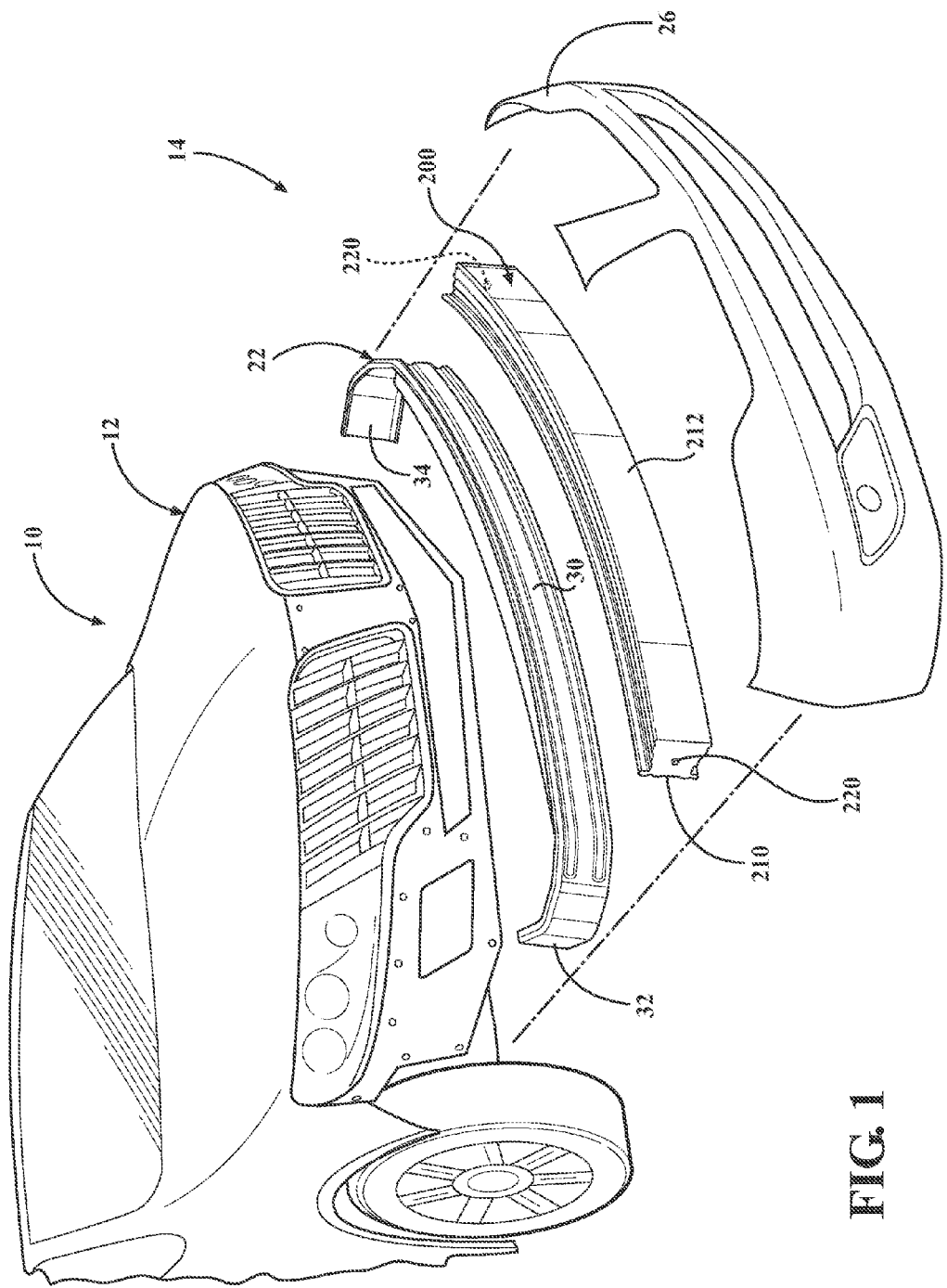
FIG. 1 is a partially exploded perspective view of an exemplary front end of a vehicle, including an exemplary sensing apparatus.

FIG. 1 is an exemplary illustration of a vehicle 10 with a front end 12. The vehicle 10 includes a front bumper assembly 14, illustrated in FIG. 1 in exploded view. The front bumper assembly includes a bumper beam 22 and a front fascia component 26, with an exemplary pressurized energy-absorbing and sensing apparatus 200 disposed therebetween.

The bumper beam 22 includes a front face 30 with a curved shape that substantially spans the width of the front end 12 of the vehicle 10. The bumper beam 22 further includes rearward-extending portions 32 and 34 configured to couple to a frame assembly (not shown) of the vehicle 10. The apparatus 200 is a closed body with a curved shape with an overall width corresponding to the size of the front face 30 of the bumper beam 22. The apparatus 200 extends across the front face 30 of the bumper beam 22 and is fixed in engagement with the front face 30. The bumper beam 22 is a relatively rigid component of a material such as, for example, steel. The apparatus 200 is relatively elastic as compared to the bumper beam 22. For example, the apparatus 200 may include plastic or foam materials.

The apparatus 200 includes a rear portion 210 sized and shaped to engage with the front face 30 of the bumper beam 22. For example, the rear portion 210 may include protrusions complementary to grooves formed into the front face 30 of the bumper beam 22. The apparatus 200 includes a forward portion 212 for engaging the inside of the front fascia component 26. The apparatus also includes pressure sensors 220, for measuring the pressure change within the apparatus 200 when a force is applied to the front end 12 of the vehicle 10, such as through a collision.

The front fascia component 26 overlaps and engages the apparatus 200 and attaches to the front end 12 of the vehicle 10. The front fascia component 26 is relatively thin as compared to the energy-absorbing component 24, and the front fascia component 26 is elastic as compared to the bumper beam 22. The front fascia component 26 may include material such as, for example, plastic. As such, the sensing apparatus 20 is in mechanical engagement with the exterior of the front fascia component 26. Therefore, a force applied to the front fascia component 26 in a location overlapping or otherwise mechanically engaged with the apparatus 200 is translated to the apparatus 200.

Figure 7:
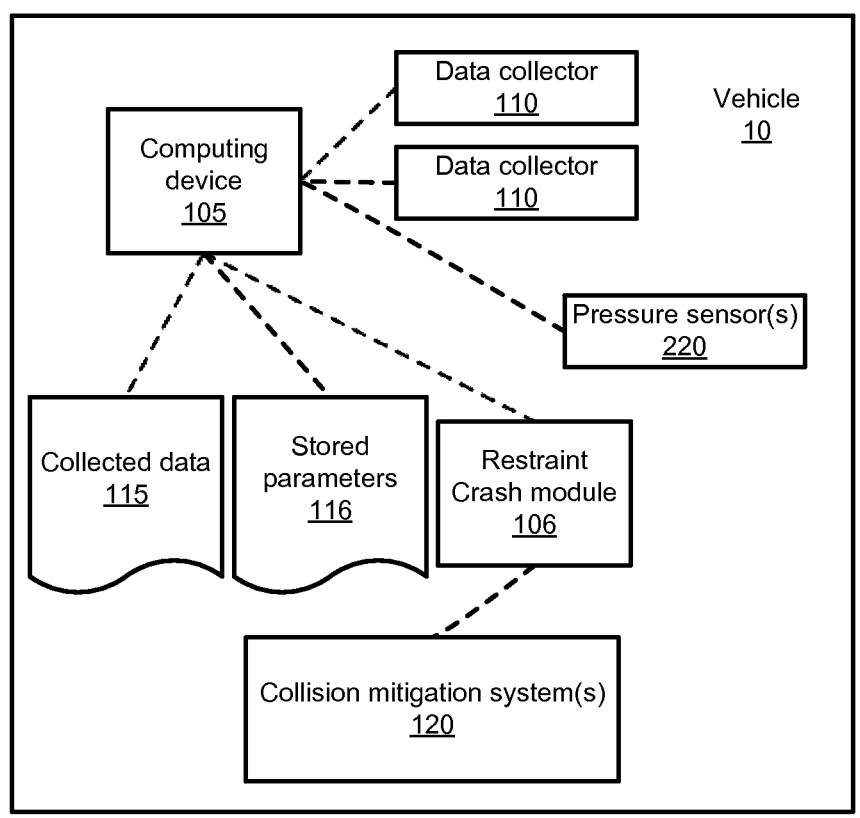
FIG. 7 is a block diagram of an exemplary vehicle system.

With further reference to FIG. 7, the vehicle 10 includes a vehicle computing device or computer 105 in communication with the pressure sensors 220 of the apparatus 200 that generally includes a processor and a memory, the memory including one or more forms of computer-readable media, and storing instructions executable by the processor for performing various operations, including as disclosed herein. The computer 105 of the vehicle 10 receives information, e.g., collected data, from one or more data collectors 110 related to various components or conditions of the vehicle 101, e.g., components such as a braking system, a steering system, a powertrain, etc., and/or conditions such as vehicle 101 speed, acceleration, pitch, yaw, roll, etc. The computer 105 generally includes restraint crash module 106 that comprises instructions for operating collision mitigation systems or equipment 120. Further, the computer 105 may include more than one computing device, e.g., controllers or the like included in the vehicle 10 for monitoring and/or controlling various vehicle components, e.g., a restraint crash module 106, an engine control unit (ECU), transmission control unit (TCU), etc. The computer is generally configured for communications on a controller area network (CAN) bus or the like. The computer may also have a connection to an onboard diagnostics connector (OBD-II). Via the CAN bus, OBD-II, and/or other wired or wireless mechanisms, the computer may transmit messages to various devices in a vehicle and/or receive messages from the various devices, e.g., controllers, actuators, sensors, etc., including the pressure sensors 220 of the apparatus 200 and collision mitigation systems or equipment 120. Alternatively or additionally, in cases where the computer actually comprises multiple devices, the CAN bus or the like may be used for communications between the multiple devices that comprise the vehicle computer. In addition, the computer may be configured for communicating with a network, which may include various wired and/or wireless networking technologies, e.g., cellular, Bluetooth, wired and/or wireless packet networks, etc.

Generally included in instructions stored in and executed by the computer 105 is a restraint crash module 106. Using data received in the computer 105, e.g., from data collectors 110, including the pressure sensors 220, data included as stored parameters 116, etc., the module 106 may control various vehicle 10 collision mitigation systems or equipment 120. For example, the module 106 may be used to deploy bumper- or hood-mounted airbags and hood-lifting systems if an impact with a pedestrian is detected. Further, the module 106 may include instructions for evaluating information received in the computer 105 relating to vehicle 10 operator characteristics, e.g., from pressure sensors 220 and/or other data collectors 110.

Data collectors 110 may include a variety of devices. For example, various controllers in a vehicle may operate as data collectors 110 to provide data 115 via the CAN bus, e.g., data 115 relating to vehicle speed, acceleration, etc. Further, sensors or the like, global positioning system (GPS) equipment, etc., could be included in a vehicle and configured as data collectors 110 to provide data directly to the computer 105, e.g., via a wired or wireless connection. Sensor data collectors 110 could include communication devices to send and receive information from other vehicles, such as path intentions from vehicles surrounding vehicle 10. Sensor data collectors 110 could include mechanisms such as RADAR, LADAR, sonar, etc. sensors that could be deployed to measure a distance between the vehicle 10 and other vehicles or objects. Yet other sensor data collectors 110 could include impact sensors such as pressure sensors 220. In addition, data collectors 110 may include sensors to detect a position, change in position, rate of change in position, etc., of vehicle 10 components such as a steering wheel, brake pedal, accelerator, gearshift lever, etc.

A memory of the computer 105 generally stores collected data 115. Collected data 115 may include a variety of data collected in a vehicle 10. Examples of collected data 115 are provided above, and moreover, data 115 is generally collected using one or more data collectors 110, and may additionally include data calculated therefrom in the computer 105, and/or at the server 125. In general, collected data 115 may include any data that may be gathered by a collection device 110 and/or computed from such data. Accordingly, collected data 115 could include a variety of data related to vehicle 10 operations and/or performance, data received from another vehicle, as well as data related to environmental conditions, road conditions, etc. relating to the vehicle 10. For example, collected data 115 could include data concerning a vehicle 10 speed, acceleration, pitch, yaw, roll, braking, presence or absence of precipitation, tire pressure, tire condition, etc.

A memory of the computer 105 may further store parameters 116. A parameter 116 generally governs control of a system or component of vehicle 10. These parameters may vary due to an environmental condition, road condition, vehicle 10 condition, or the like. For example, a parameter 116 may specify predetermined impact thresholds for identifying pedestrians and, thus, conditions for deployment of pedestrian impact mitigation systems such as bumper- or hood-mounted airbags and hood-lifting systems.

Figure 2A:
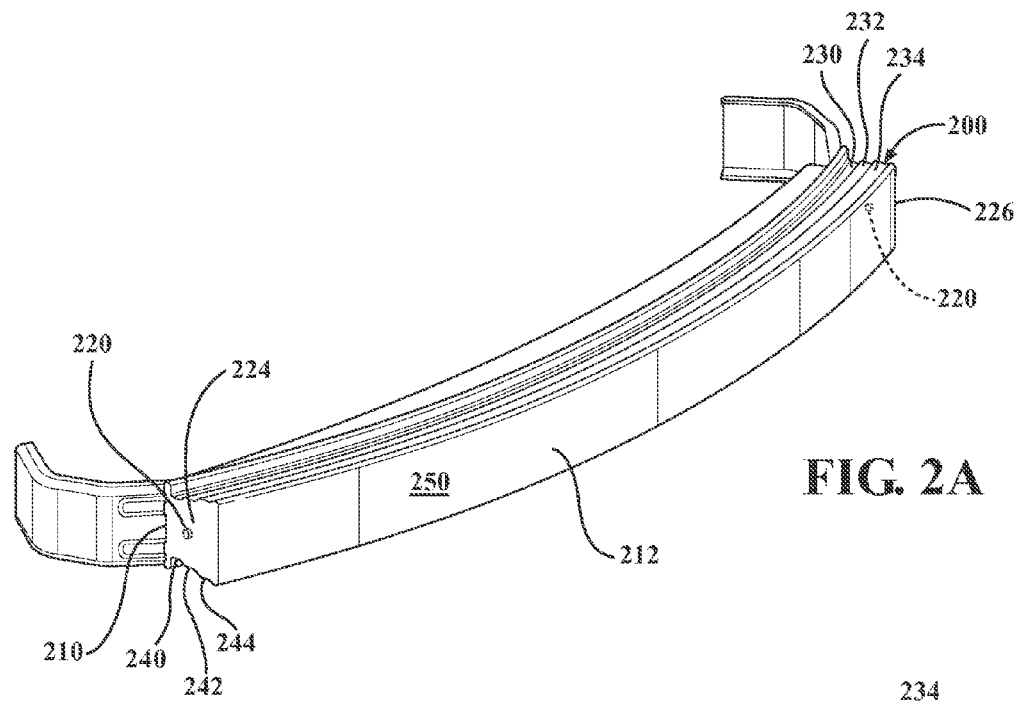
FIG. 2A is a perspective view of the exemplary bumper beam and pressurized energy absorber of FIG. 1.
Figure 2B:
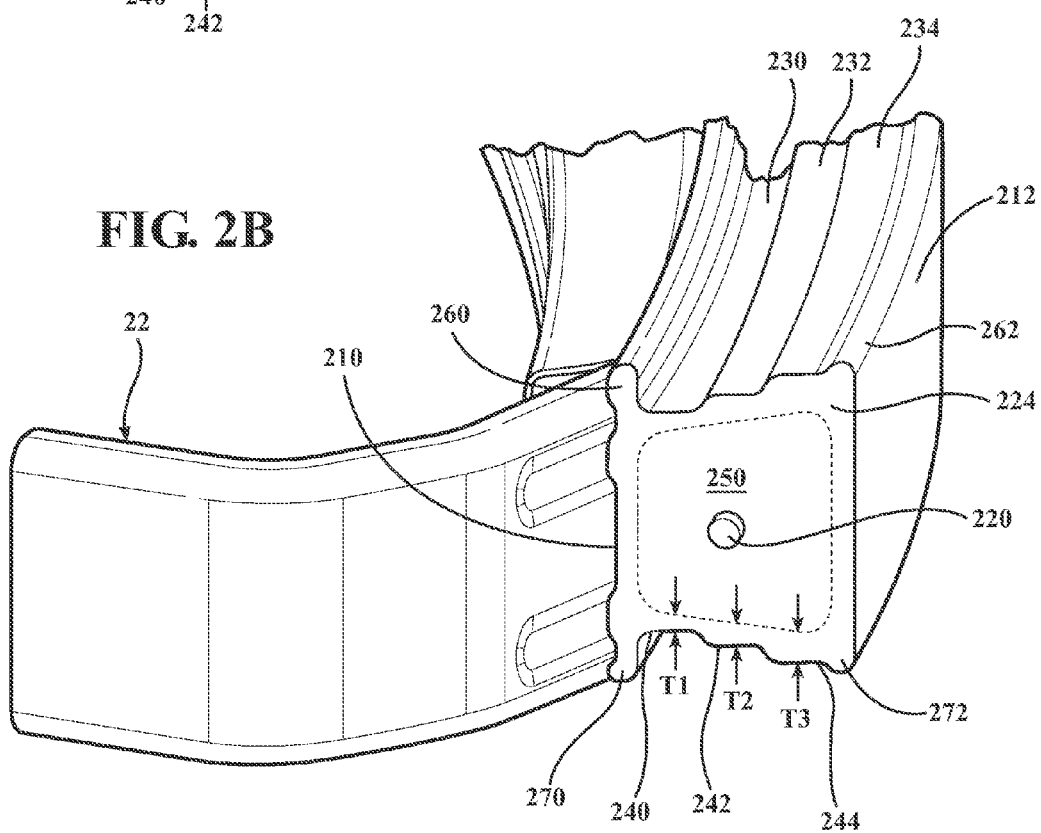
FIG. 2B is a partial perspective view of the exemplary bumper beam and pressurized energy absorber of FIG. 2A.

FIGS. 2A-2B are perspective views of the apparatus 200 engaged with the bumper beam 22 of vehicle 10. The apparatus 200 has a generally elongate duct shape with rear and forward portions 210, 212 extending across the width thereof. The apparatus 200 includes first and second sidewalls 224, 226 coupled between the rear and front portions 210, 212 at opposing ends thereof, respectively. The sensors 220 are respectively secured to the first and second sidewalls 224, 226. The apparatus 200 further includes first, second and third top portions 230, 232, 234 extending across the apparatus 200. The first, second and third top portions 230, 232, 234 are arranged in series between the rear portion 210 and the forward portion 212. The first top portion 230 is adjacent to and engages a top edge 260 of the rear portion 210. The third top portion 234 is adjacent to and engages a top edge 262 of the forward portion 212. The second top portion 232 is between the first top portion 230 and the third top portion 234. The apparatus 200 also includes first, second and third bottom portions 240, 242, 244 extending across the apparatus 200. The first, second and third bottom portions 240, 242, 244 are arranged in series between the rear portion 210 and the forward portion 212. The first bottom portion 240 is adjacent to and engages a bottom edge 270 of the rear portion 210. The third bottom portion 244 is adjacent to and engages a bottom edge 272 of the forward portion 212. The second bottom portion 242 is between the first bottom portion 240 and the third bottom portion 244.

Each of the first, second and third top portions 230, 232, 234 and each of the first, second and third bottom portions 240, 242, 244 may be configured with a different stiffness, such as through a different thickness along the width of the apparatus 200. For example, as illustrated in FIG. 2B, first bottom portion 240 has a first thickness T1, second bottom portion 242 has a second thickness T2, and third bottom portion 244 has a third thickness T3. As shown in the exemplary illustrations, third thickness T3 is greater than second thickness T2, and second thickness T2 is greater than first thickness T1. Accordingly, for example, third bottom portion 244 has a greater stiffness than second bottom portion 242, and second bottom portion 242 has a greater stiffness than first bottom portion 240. It should be understood that top and/or bottom portions respectively arranged in series in the manner exemplary first, second and third top portions 230, 232, 234 and exemplary first, second and third bottom portions 240, 242, 244 of may also vary in stiffness alternatively or in addition to the exemplary differences in thickness through, for example, variations in material composition and/or through the addition of strengthening features, such as strengthening beads applied thereto.

The rear portion 210, the forward portion 212, the sidewalls 224, 226, the top portions 230, 232, 234 and the bottom portions 240, 242, 244 enclose an interior volume 250. The pressure sensors 220 are in fluid communication with the interior volume 250.

Through the variations in configuration of the first, second and third top portions 230, 232, 234 and the first, second and third bottom portions 240, 242, 244, the apparatus 200 provides a range of responses to impact forces applied to the front end 12 of the vehicle 10, toward sensing and/or absorbing kinetic energy in the event of a collision or impact with the front end 12 of the vehicle 10. For example, with first top portion 230 and first bottom portion 240 having relatively narrow thicknesses, and, therefore, each having relatively low stiffness, the apparatus 200 is partially deformable in response to relatively low impact forces, such as a collision of the vehicle 10 with a pedestrian, so as to generate a change in the pressure of interior volume 250 which may be detected by pressure sensors 220. The pressure sensors 220 generate pressure signals from which the vehicle computer may discriminate between objects, so as to further control the operation of collision mitigation equipment and systems. The remaining top portions 232, 234 and bottom portions 242, 244 of the apparatus 200, which have greater stiffnesses than the first top portion 230 and first bottom portion 240, deform, crush, or flatten at relatively greater impact forces in order to absorb kinetic energy in the event of a collision or impact with the front end 12 of the vehicle 10, towards mitigating the energy transferred to the bumper beam and other parts of vehicle 10 during collisions generating such relatively greater impact forces. Accordingly, the apparatus 200 provides energy-absorbing and sensing functionality for vehicle 10 in response to a wide range of impact forces.

Figure 3A:
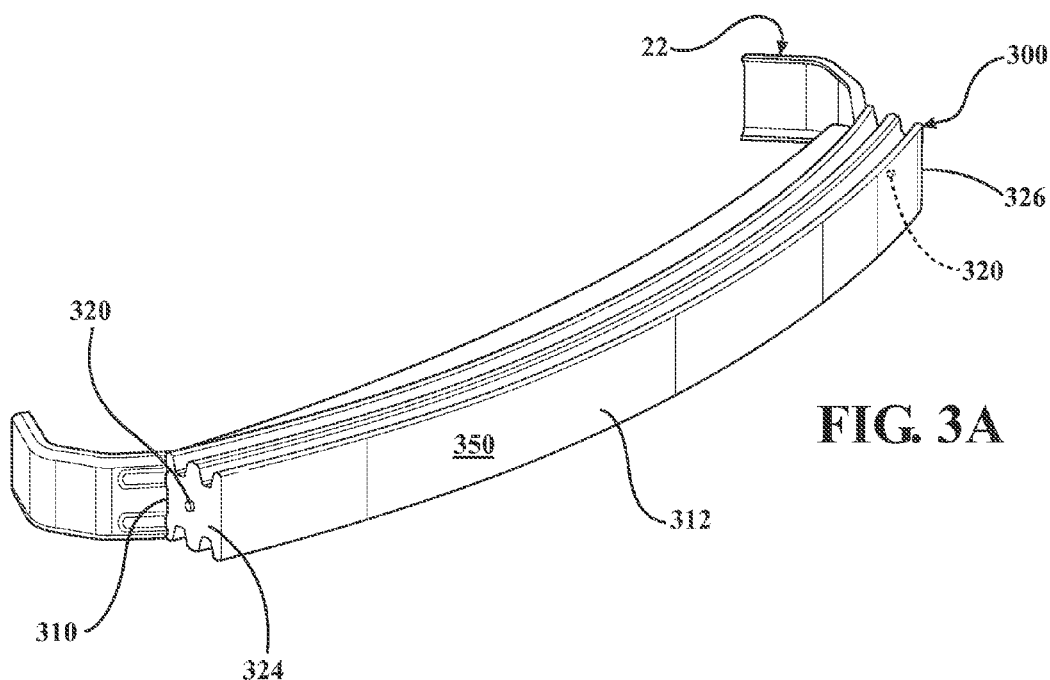
FIG. 3A is a perspective view of the exemplary bumper beam of FIG. 1 and another exemplary pressurized energy absorber.
Figure 3B:
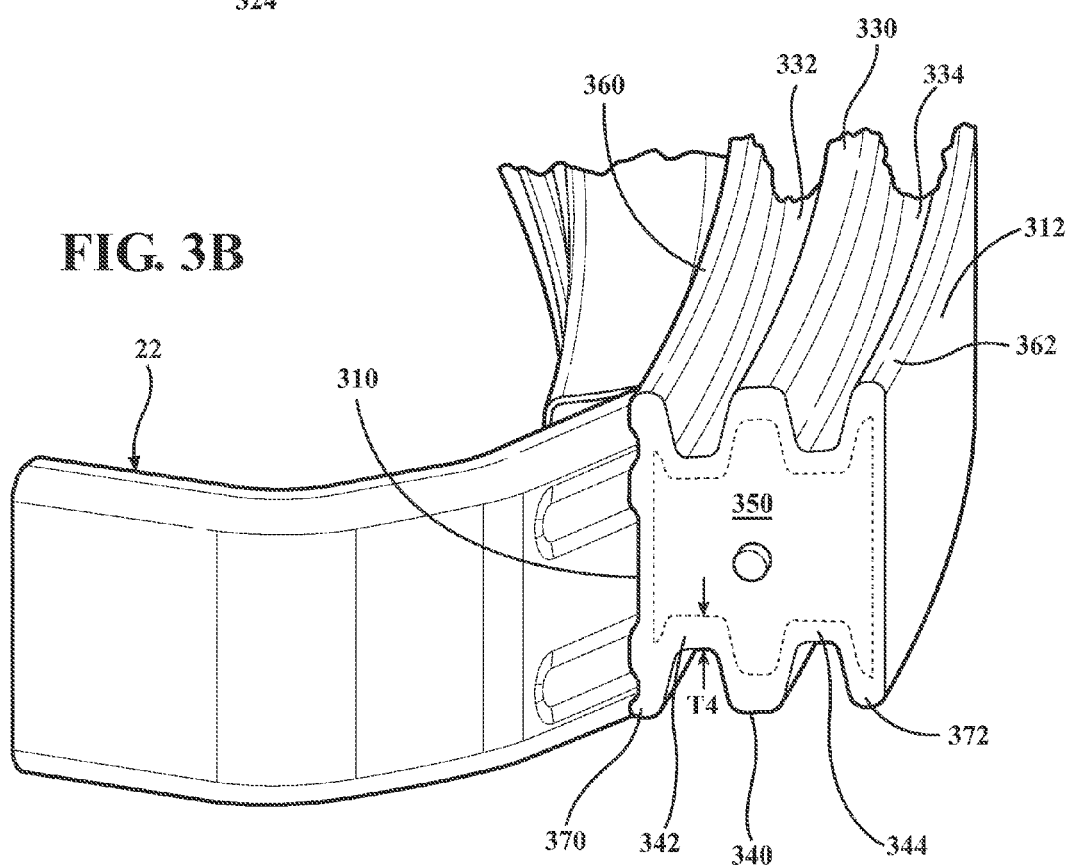
FIG. 3B is a partial perspective view of the exemplary bumper beam and pressurized energy absorber of FIG. 3A.

FIGS. 3A-3B are perspective views of another exemplary energy-absorbing and sensing apparatus 300 engaged with the bumper beam 22 of vehicle 10. The apparatus 300 is a closed body with a generally elongate duct shape with rear and forward portions 310, 312 extending across the width thereof. The apparatus 300 includes first and second sidewalls 324, 326 coupled between the rear and front portions 310, 312 at opposing ends thereof, respectively. The sensors 320 are respectively secured to the first and second sidewalls 324, 326. The apparatus 300 further includes first, second and third top portions 330, 332, 334 extending across the apparatus 300. The first, second and third top portions 330, 332, 334 are arranged in series in a corrugated configuration between the rear portion 310 and the forward portion 312. The first top portion 330 is between the second top portion 332 and the third top portion 334. The second top portion 332 is adjacent to and engages a top edge 360 of the rear portion 310. The third top portion 334 is adjacent to and engages a top edge 362 of the forward portion 312. The apparatus 300 also includes first, second and third bottom portions 340, 342, 344 extending across the apparatus 300. The first, second and third bottom portions 340, 342, 344 are arranged in series in a corrugated configuration between the rear portion 310 and the forward portion 312. The first bottom portion 340 is between the second bottom portion 342 and the third bottom portion 344. The second bottom portion 342 is adjacent to and engages a bottom edge 370 of the rear portion 310. The third bottom portion 344 is adjacent to and engages a bottom edge 372 of the forward portion 312.

The corrugated configurations of the first, second and third top portions 330, 332, 334 and of the first, second and third bottom portions 340, 342, 344 provide the apparatus 300 with a varying stiffness. For example, as illustrated in FIG. 3B, the shape and partial displacement or offset placement of the first bottom portion 340 relative to second and third bottom portions 342, 344 provides the apparatus 300 a greater stiffness at first bottom portion 340 as compared to second and third bottom portions 342, 344. It should be understood that top and/or bottom portions respectively arranged in series in corrugated configurations in the manner of exemplary first, second and third top portions 330, 332, 334 and exemplary first, second and third bottom portions 340, 342, 344 of may also vary in stiffness through, for example, variations in the thickness T4, material composition and/or through the addition of strengthening features, such as strengthening beads applied thereto.

The rear portion 310, the forward portion 312, the sidewalls 324, 326, the top portions 330, 332, 334 and the bottom portions 340, 342, 344 enclose an interior volume 350. The pressure sensors 320 are in fluid communication with the interior volume 350.

As similarly set forth above with regard to the exemplary apparatus 200, the apparatus 300 provides a range of responses to impact forces applied to the front end 12 of the vehicle 10, toward sensing and/or absorbing kinetic energy in the event of a collision or impact with the front end 12 of the vehicle 10. For example, through the variations in stiffness from the configuration of the first, second and third top portions 330-334 and the first, second and third bottom portions 340-344, the apparatus 300 is partially deformable in response to relatively low impact forces, such as a collision of the vehicle 10 with a pedestrian, so as to generate a change in the pressure of interior volume 350 which may be detected by pressure sensors 320. The pressure sensors 320 generate pressure signals from which the vehicle computer may discriminate between objects, so as to further control the operation of collision mitigation equipment and systems. The remaining relatively stiffer portions of the apparatus 300 deform, crush, or flatten at relatively greater impact forces in order to absorb kinetic energy in the event of a collision or impact with the front end 12 of the vehicle 10, towards mitigating the energy transferred to the bumper beam and other parts of vehicle 10 during collisions generating such relatively greater impact forces. Accordingly, the apparatus 300 provides energy-absorbing and sensing functionality for vehicle 10 in response to a wide range of impact forces.

Figure 4A:
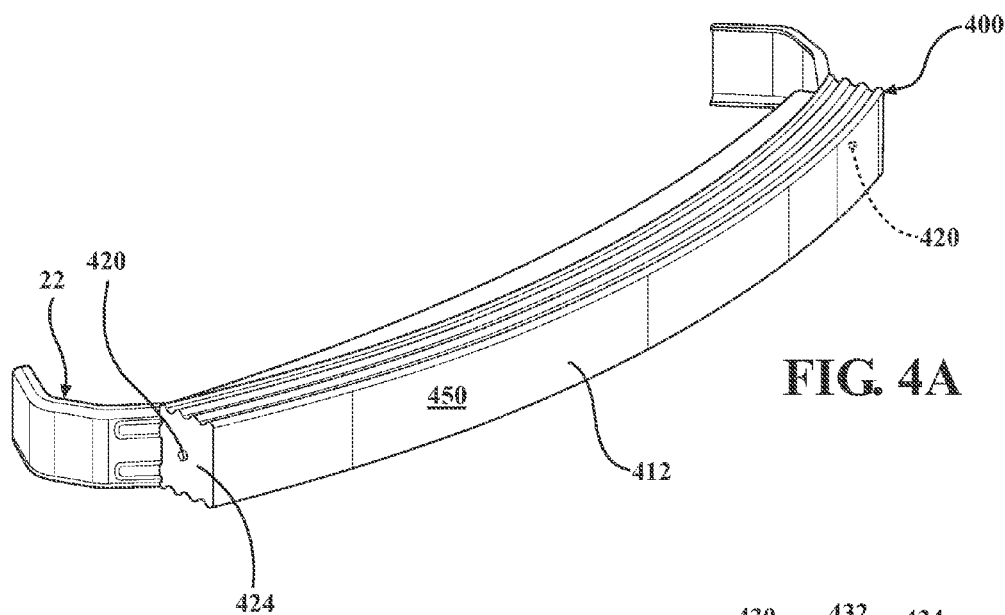
FIG. 4A is a perspective view of the exemplary bumper beam of FIG. 1 and another exemplary pressurized energy absorber.
Figure 4B:
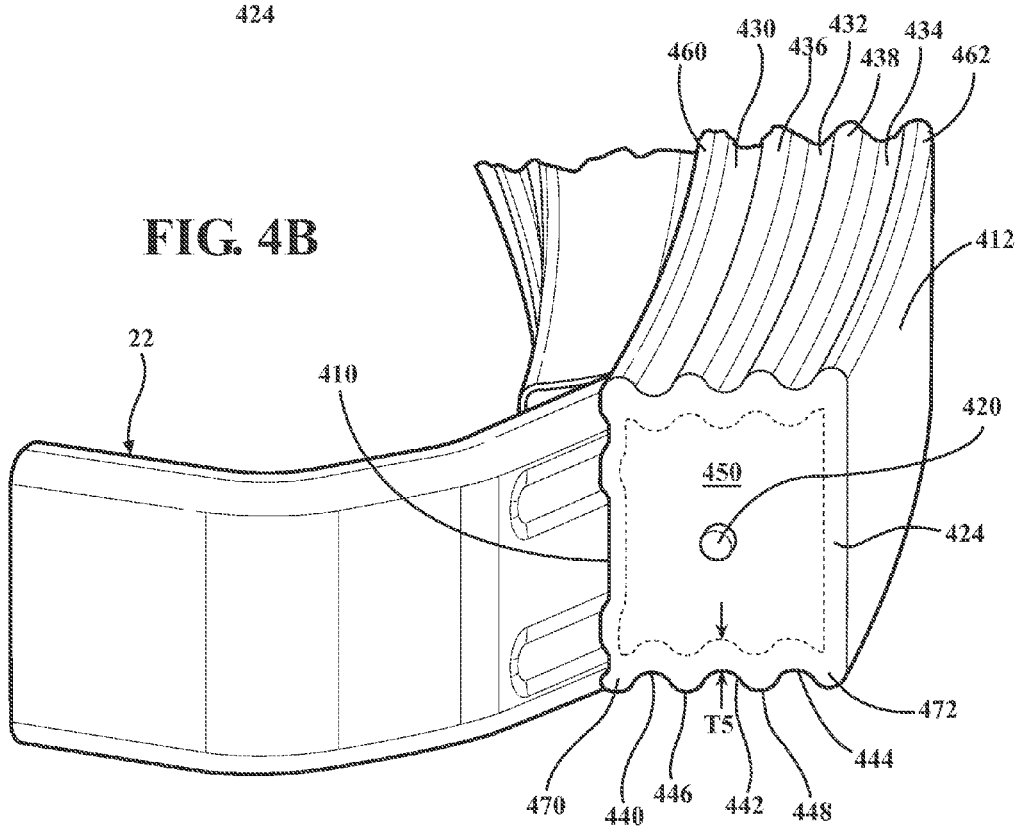
FIG. 4B is a partial perspective view of the exemplary bumper beam and pressurized energy absorber of FIG. 4A.

FIGS. 4A-4B are perspective views of another exemplary energy-absorbing and sensing apparatus 400 engaged with the bumper beam 22 of vehicle 10. The apparatus 400 is a closed body with a generally elongate duct shape with rear and forward portions 410, 412 extending across the width thereof. The apparatus 400 includes first and second sidewalls 424, 426 coupled between the rear and front portions 410, 412 at opposing ends thereof, respectively. The sensors 420 are respectively secured to the first and second sidewalls 424, 426. The apparatus 400 further includes first through fifth top portions 430, 432, 434, 436, 438 extending across the apparatus 400. The first, second and third top portions 430, 432, 434 are arranged in an alternating series with fourth and fifth top portions 436, 438 in a ribbed configuration between the rear portion 410 and the forward portion 412. The first top portion 430 is adjacent to and engages a top edge 460 of the rear portion 410 on one side thereof, and, on the other, the fourth top portion 436, which is in the shape of an exterior rib. The second top portion 432 is adjacent to and engages the fourth top portion 436 on one side, and, on the other side, the fifth top portion 438, which is also in the shape of an exterior rib. The third top portion 434 is adjacent to and engages the fourth top portion 436 on one side, and, on the other side, a top edge 462 of the forward portion 412. The apparatus 400 also includes first through fifth bottom portions 440, 442, 444, 446, 448 extending across the apparatus 400. The first, second and third bottom portions 440, 442, 444 are arranged in an alternating series with fourth and fifth bottom portions 446, 448 in a ribbed configuration between the rear portion 410, having a bottom edge 470, and the forward portion 412, having a bottom edge 472, similar to the first through fifth top portions 430, 432, 434, 436, 438 set forth herein.

The ribbed configurations of the first through fifth top portions 430, 432, 434, 436, 438 and of the first through fifth bottom portions 440, 442, 444, 446, 448 provide the apparatus 400 with a varying stiffness. For example, as illustrated in FIG. 4B, the shape and partial displacement or offset position of the ribbed fourth and fifth bottom portions 446, 448 relative to the other bottom portions provides the apparatus 400 a greater stiffness at the fourth and fifth bottom portions 446, 448 as compared to the other bottom portions. It should be understood that top and/or bottom portions respectively arranged in an alternating series in ribbed configurations in the manner of exemplary first through fifth top portions 430-438 and exemplary first through fifth bottom portions 440, 442, 444, 446, 448 may also vary in stiffness through, for example, variations in the thickness T5, material composition and/or through the addition of strengthening features, such as strengthening beads applied thereto.

The rear portion 410, the forward portion 412, the sidewalls 424, 426, the top portions 430, 432, 434, 436, 438 and the bottom portions 440, 442, 444, 446, 448 enclose an interior volume 450. The pressure sensors 420 are in fluid communication with the interior volume 450.

As similarly set forth above with regard to the exemplary apparatuses 200 and 300, the apparatus 400 provides a range of responses to impact forces applied to the front end 12 of the vehicle 10, toward sensing and/or absorbing kinetic energy in the event of a collision or impact with the front end 12 of the vehicle 10. For example, through the variations in stiffness from the ribbed configuration of the first through fifth top portions 430, 432, 434, 436, 438 and the first through fifth bottom portions 440, 442, 444, 446, 448, the apparatus 400 is partially deformable in response to relatively low impact forces, such as a collision of the vehicle 10 with a pedestrian, so as to generate a change in the pressure of interior volume 450 which may be detected by pressure sensors 420. The pressure sensors 420 generate pressure signals from which the vehicle computer may discriminate between objects, so as to further control the operation of collision mitigation equipment and systems. The remaining relatively stiffer portions of the apparatus 400 deform, crush, or flatten at relatively greater impact forces in order to absorb kinetic energy in the event of a collision or impact with the front end 12 of the vehicle 10, towards mitigating the energy transferred to the bumper beam and other parts of vehicle 10 during collisions generating such relatively greater impact forces. Accordingly, the apparatus 400 provides energy-absorbing and sensing functionality for vehicle 10 in response to a wide range of impact forces.

FIG. 5 is a perspective view of another exemplary energy-absorbing and sensing apparatus 500 engaged with the bumper beam 22 of vehicle 10. The apparatus 500 is a closed body with a generally elongate duct shape with rear and forward portions 510, 512 extending across the width thereof. The apparatus 500 includes first and second sidewalls 524, 526 coupled between the rear and front portions 510, 512 at opposing ends thereof, respectively. The sensors 520 are respectively secured to the first and second sidewalls 524, 526. The apparatus 500 further includes first through fifth top portions 530, 532, 534, 536, 538 extending across the apparatus 500. The first, second and third top portions 530, 532, 534 are arranged in an alternating series with fourth and fifth top portions 536, 538 in a ribbed configuration between the rear portion 510 and the forward portion 512. The first top portion 530 is adjacent to and engages a top edge 560 of the rear portion 510 on one side thereof, and, on the other, the fourth top portion 536, which is in the shape of an exterior rib. The second top portion 532 is adjacent to and engages the fourth top portion 536 on one side, and, on the other side, the fifth top portion 538, which is also in the shape of an exterior rib. The third top portion 534 is adjacent to and engages the fourth top portion 536 on one side, and, on the other side, a top edge 562 of the forward portion 512. The apparatus 500 also includes through fifth bottom portions 540, 542, 544, 546, 548 extending across the apparatus 500. The first, second and third bottom portions 540, 542, 544 are arranged in an alternating series with fourth and fifth bottom portions 546, 548 in a ribbed configuration between the rear portion 510 and the forward portion 512, similar to the first through fifth top portions 530, 532, 534, 536, 538 set forth herein.

The ribbed configurations of the first through fifth top portions 530-538 and of the first through fifth bottom portions 540, 542, 544, 546, 548 provide the apparatus 500 with a varying stiffness as described herein with respect to the exemplary first through fifth top portions 430, 432, 434, 436, 438 and exemplary first through fifth bottom portions 440, 442, 444, 446, 448 of the apparatus 400. Furthermore, the apparatus 500 is provided a varying stiffness through the variation in size of the forward portion 512 along the width of the apparatus 500, illustrated through the height or thickness T7 being greater than heights or thicknesses T6 and T8.

The rear portion 510, the forward portion 512, the sidewalls 524, 526, the top portions 530, 532, 534, 536, 538 and the bottom portions 540, 542, 544, 546, 548 enclose an interior volume 550. The pressure sensors 520 are in fluid communication with the interior volume 550.

As similarly set forth above with regard to the exemplary apparatuses 200, 300 and 400, the apparatus 500 provides a range of responses to impact forces applied to the front end 12 of the vehicle 10, toward sensing and/or absorbing kinetic energy in the event of a collision or impact with the front end 12 of the vehicle 10. For example, through the variations in stiffness, the apparatus 500 is partially deformable in response to relatively low impact forces, such as a collision of the vehicle 10 with a pedestrian, so as to generate a change in the pressure of interior volume 550 which may be detected by pressure sensors 520. The pressure sensors 520 generate pressure signals from which the vehicle computer may discriminate between objects, so as to further control the operation of collision mitigation equipment and systems. The remaining relatively stiffer portions of the apparatus 500 deform, crush, or flatten at relatively greater impact forces in order to absorb kinetic energy in the event of a collision or impact with the front end 12 of the vehicle 10, towards mitigating the energy transferred to the bumper beam and other parts of vehicle 10 during collisions generating such relatively greater impact forces. Accordingly, the apparatus 500 provides energy-absorbing and sensing functionality for vehicle 10 in response to a wide range of impact forces.

An energy-absorbing and sensing apparatus according to the present disclosure may also vary in configuration with variations in shape and/or material composition across the width thereof, alone or in combination with variations in configuration, size or thickness as discussed herein. For example, an energy-absorbing and sensing apparatus according to the present disclosure may include have a variety of cross-sectional shapes, including, for example, circular, elliptical, and rectangular.

Figure 6:
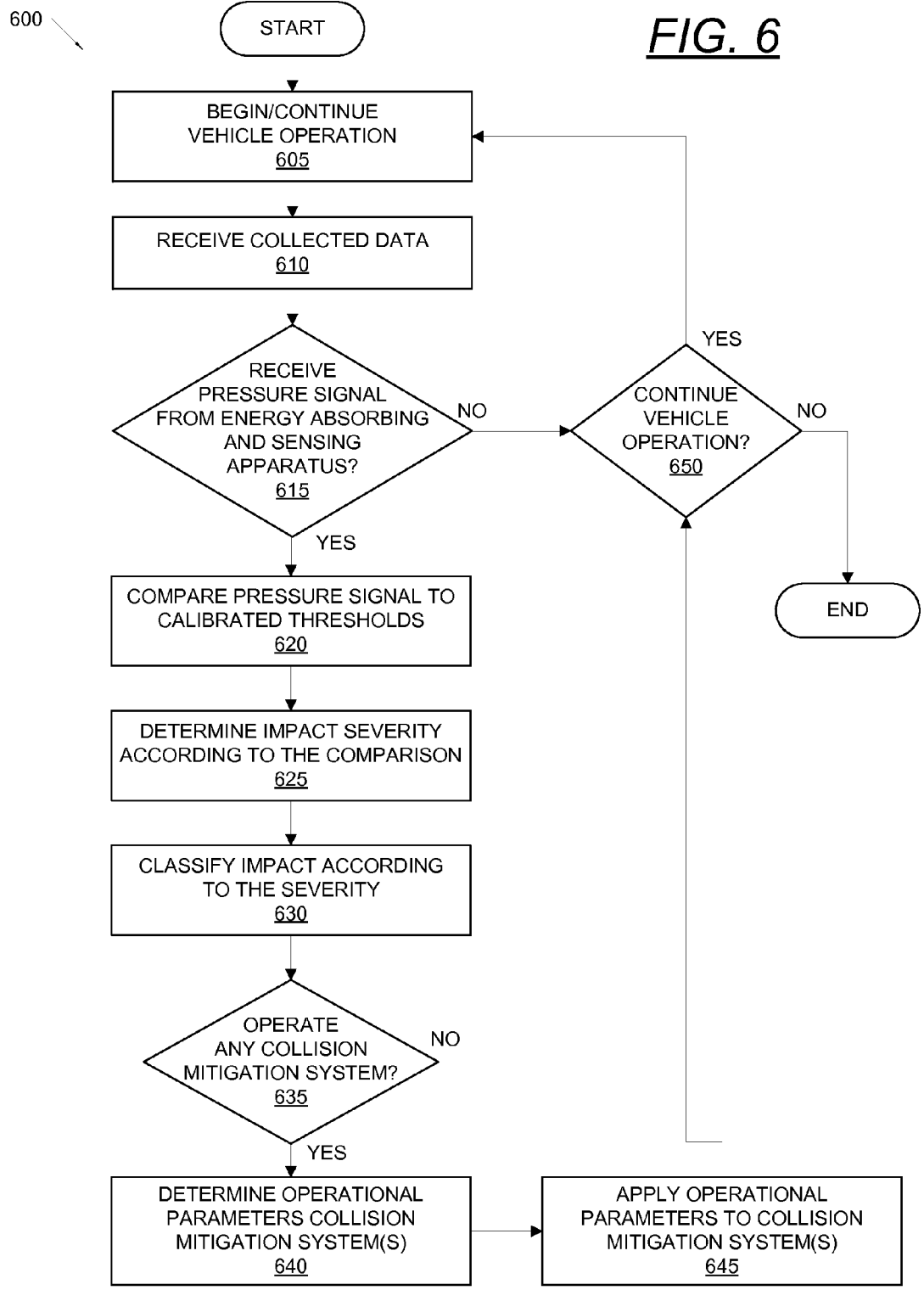
FIG. 6 illustrates an exemplary process for utilizing an exemplary energy-absorbing and sensing apparatus in collision detection and evaluation.

FIG. 6 is a diagram of an exemplary process 600 for utilizing an exemplary energy-absorbing and sensing apparatus of the present disclosure, e.g. apparatus 200, 300, 400 or 500.

The process 600 begins in a block 605, in which the vehicle 10 commences or continues operation. Following the block 605, in a block 610, the computer 105 receives collected data 115. As mentioned above, collected data 115 may be provided via one or more of a variety of data collection devices 110, including pressure sensors 220, and may include data concerning vehicle 10 speed, pitch, yaw, roll, environmental conditions, road conditions, etc.

Following the block 610, in a block 615, the computer 105 evaluates collected data 115 gathered as described with respect to the block 610 to determine whether a pressure signal from pressure sensors 220 has been received. If a pressure signal from pressure sensors 220 has been received, next, in a block 620, the computer 105 and module 106 compare the pressure signal from pressure sensors 220 to calibrated thresholds, stored as a part of parameters 116, for the energy-absorbing and sensing apparatus.

Next, in blocks 625 and 630, the computer 105 and the module 106 determine the impact severity based on the comparison at block 620, and classify the impact according to the severity relative to additional stored parameters 116. For example, if the impact is within a known severity corresponding with the severity of impacts with pedestrians, the computer 105 and module 106 classify the impact as a pedestrian impact.

Next, in a block 635, the computer 105 and module 106 determine whether any collision mitigation systems 120 are to be operated, based on the classification and severity of the impact as determined in blocks 625 and 630. If any collision mitigation systems 120 are to be operated, next, in blocks 640 and 645, the computer 105 and the module 106 select and apply operational parameters for the collision mitigation systems 120 from the stored parameters 116.

Following block 645, or block 615, if no pressure signal from pressure sensors 220 is initially received, then the block 650 is executed next, to determine if vehicle 10 is to remain in operation. If not, the process 600 ends. If vehicle 10 remains in operation, process 600 returns to the blocks 605, 610, and 615. Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. An apparatus comprising:
    an enclosed body defining a chamber therein, the body including a rearward portion, a forward portion opposite the rearward portion and a first portion extending between the rearward and forward portions, the first portion having a stiffness less than at least one remaining portion of the body; and
    at least one pressure sensor coupled to the body and the chamber to detect deformation of the first portion of the body.

2. The apparatus of claim 1, wherein the first portion includes at least one of a variation in size, thickness, shape and material composition from the at least one remaining portion of the body.

3. The apparatus of claim 2, wherein the body includes a second portion extending between the rearward and forward portions, the first and second portions being arranged in series between the rearward and forward portions, the first portion having a stiffness less than the second portion.

4. The apparatus of claim 3, wherein the first portion has a thickness less than the second portion.

5. The apparatus of claim 3, wherein the first and second portions are partially offset from one another.

6. The apparatus of claim 5, wherein the first and second portions are arranged in a corrugated configuration.

7. The apparatus of claim 5, wherein the first and second portions are arranged in a ribbed configuration.

8. The apparatus of claim 1, wherein the rearward and forward portions of the body vary in height along the width of the body.

9. The apparatus of claim 1, further comprising a first pressure sensor coupled to a first sidewall of the body, and a second pressure sensor coupled to a second sidewall of the body, the first and second sidewalls being coupled at opposing ends of the body along the width thereof.

10. An assembly comprising:
    a bumper beam for a vehicle;
    an enclosed body defining a chamber therein, the body including a rearward portion engaged with the bumper beam, a forward portion opposite the rearward portion and a first portion extending between the rear and forward portions, the first portion having a stiffness less than at least one remaining portion of the body, the at least one remaining portion of the body having a stiffness less than the bumper beam; and
    at least one pressure sensor coupled to the body and in communication with the chamber, the at least one pressure sensor detecting deformation of the first portion of the body.

11. The assembly of claim 10, wherein the first portion includes at least one of a variation in size, thickness, shape and material composition from the at least one remaining portion of the body.

12. The assembly of claim 11, wherein the body includes a second portion extending between the rearward and forward portions, the first and second portions being arranged in series between the rearward and forward portions, the first portion having a stiffness less than the second portion.

13. The assembly of claim 12, wherein the first portion has a thickness less than the second portion.

14. The assembly of claim 12, wherein the first and second portions are partially offset from one another.

15. The assembly of claim 14, wherein the first and second portions are arranged in a corrugated configuration.

16. The assembly of claim 14, wherein the first and second portions are arranged in a ribbed configuration.

17. The assembly of claim 10, wherein the rearward and forward portions of the body vary in height along the width of the body.

18. The assembly of claim 10, further comprising a first pressure sensor coupled to a first sidewall of the body, and a second pressure sensor coupled to a second sidewall of the body, the first and second sidewalls being coupled at opposing ends of the body along the width thereof.

\* \* \* \* \*